United States Patent
Champlin et al.

(10) Patent No.: US 7,844,037 B2
(45) Date of Patent: Nov. 30, 2010

(54) METHOD AND DEVICE FOR ENABLING MESSAGE RESPONSES TO INCOMING PHONE CALLS

(75) Inventors: David Champlin, Menlo Park, CA (US); Srikiran Prasad, Cupertino, CA (US); Lang Chen, Oakland, CA (US); Rajan Ranga, Palo Alto, CA (US); Robert Haitani, Menlo Park, CA (US)

(73) Assignee: Palm, Inc., Sunnyvale, CA (US)

( * ) Notice: Subject to any disclaimer, the term of this patent is extended or adjusted under 35 U.S.C. 154(b) by 1481 days.

(21) Appl. No.: 11/200,511

(22) Filed: Aug. 8, 2005

(65) Prior Publication Data
US 2007/0036286 A1 Feb. 15, 2007

(51) Int. Cl.
*H04M 1/64* (2006.01)

(52) U.S. Cl. .............. 379/88.17; 379/88.19; 379/88.21; 379/88.22; 455/412.1; 705/26; 709/238

(58) Field of Classification Search ................ 379/67.1, 379/88.13, 76, 88.19, 88.21, 93.23, 202.01, 379/257, 88.22, 93.17, 211.01, 215.01, 71, 379/88.23, 88.25, 157, 88.17; 455/414.4, 455/412.1, 415, 445, 567; 370/356, 352, 370/384; 705/26; 709/238, 206, 224; 725/134, 725/111; 327/108; 340/7.21, 7.22; 715/246
See application file for complete search history.

(56) References Cited

U.S. PATENT DOCUMENTS

| | | | | |
|---|---|---|---|---|
| 4,922,526 A | * | 5/1990 | Morganstein et al. | 379/157 |
| 4,996,704 A | * | 2/1991 | Brunson | 379/88.19 |
| 5,396,544 A | * | 3/1995 | Gilbert et al. | 379/88.23 |
| 5,585,749 A | * | 12/1996 | Pace et al. | 327/108 |
| 5,724,408 A | * | 3/1998 | Morganstein | 379/88.2 |
| 5,748,100 A | * | 5/1998 | Gutman et al. | 340/7.22 |
| 5,751,707 A | * | 5/1998 | Voit et al. | 370/384 |
| 5,805,978 A | * | 9/1998 | Souissi et al. | 340/7.21 |
| 5,844,967 A | * | 12/1998 | Lee | 379/88.23 |
| 5,884,193 A | * | 3/1999 | Kaplan | 455/565 |
| 5,894,505 A | * | 4/1999 | Koyama | 379/67.1 |
| 5,943,401 A | * | 8/1999 | Risner et al. | 379/88.22 |
| 5,991,290 A | * | 11/1999 | Malik | 370/352 |
| 6,055,305 A | * | 4/2000 | Norman et al. | 379/211.01 |
| 6,081,845 A | * | 6/2000 | Kanemaki et al. | 709/238 |

(Continued)

FOREIGN PATENT DOCUMENTS

KR 20060093183 A 8/2006

(Continued)

OTHER PUBLICATIONS

International Search Report and Written Opinion mailed Jan. 29, 2009 for PCT/US2008/074320 14 pgs.

*Primary Examiner*—Gerald Gauthier
(74) *Attorney, Agent, or Firm*—Mahamedi Paradice Kreisman LLP (57) ABSTRACT

A computing device is configured to receive an incoming communication from another computing device. The incoming communication may be for purpose of initiating a voice-exchange session. In response to receiving the incoming call, the computing device may identify or determine a message identifier of the other computing device. The message identifier is determined based at least in part on data provided with the incoming communication. The computing device may programmatically address a message to the other computing device using the message identifier determined from the incoming communication.

25 Claims, 4 Drawing Sheets

U.S. PATENT DOCUMENTS

| | | | |
|---|---|---|---|
| 6,219,413 B1 * | 4/2001 | Burg | 379/215.01 |
| 6,229,878 B1 * | 5/2001 | Moganti | 379/67.1 |
| 6,404,860 B1 * | 6/2002 | Casellini | 379/88.17 |
| 6,430,271 B1 * | 8/2002 | DeJesus et al. | 379/88.22 |
| 6,484,036 B1 | 11/2002 | Sorkin et al. | |
| 6,647,108 B1 * | 11/2003 | Wurster et al. | 379/215.01 |
| 6,680,935 B1 * | 1/2004 | Kung et al. | 370/352 |
| 6,697,473 B2 * | 2/2004 | Batten | 379/199 |
| 6,768,789 B1 * | 7/2004 | Wilk | 379/67.1 |
| 6,795,530 B1 * | 9/2004 | Gilbert et al. | 379/76 |
| 6,804,334 B1 * | 10/2004 | Beasley et al. | 379/88.17 |
| 6,823,184 B1 * | 11/2004 | Nelson | 455/418 |
| 6,839,877 B2 * | 1/2005 | Iwata | 715/246 |
| 7,009,990 B1 * | 3/2006 | Adams et al. | 370/429 |
| 7,010,288 B2 * | 3/2006 | Brown et al. | 455/412.1 |
| 7,027,583 B2 * | 4/2006 | Uranaka et al. | 379/220.01 |
| 7,051,099 B2 * | 5/2006 | Ziegler et al. | 709/224 |
| 7,136,466 B1 * | 11/2006 | Gao | 379/93.23 |
| 7,218,710 B1 * | 5/2007 | Ali et al. | 379/88.23 |
| 7,286,649 B1 * | 10/2007 | Nelson et al. | 379/71 |
| 7,570,747 B2 * | 8/2009 | Nakatsu | 379/88.25 |
| 7,634,069 B2 * | 12/2009 | Randall et al. | 379/93.17 |
| 2001/0003826 A1 * | 6/2001 | Iwata | 709/206 |
| 2002/0067714 A1 * | 6/2002 | Crain et al. | 370/352 |
| 2002/0187794 A1 * | 12/2002 | Fostick et al. | 455/466 |
| 2004/0203794 A1 * | 10/2004 | Brown et al. | 455/445 |
| 2004/0230494 A1 * | 11/2004 | Lotvin et al. | 705/26 |
| 2005/0201533 A1 * | 9/2005 | Emam et al. | 379/88.19 |
| 2005/0216949 A1 * | 9/2005 | Candelora et al. | 725/134 |
| 2005/0227740 A1 * | 10/2005 | Orbach | 455/567 |
| 2006/0015644 A1 * | 1/2006 | Cernohous et al. | 709/238 |
| 2006/0020993 A1 * | 1/2006 | Hannum et al. | 725/111 |
| 2006/0041470 A1 | 2/2006 | Filho et al. | |
| 2006/0215829 A1 * | 9/2006 | Schwartz | 379/207.02 |
| 2007/0003027 A1 * | 1/2007 | Brandt | 379/88.14 |
| 2007/0081657 A1 * | 4/2007 | Turner | 379/257 |
| 2007/0121607 A1 * | 5/2007 | Gao | 370/356 |
| 2007/0143429 A1 | 6/2007 | Venkataraman et al. | |
| 2007/0258567 A1 * | 11/2007 | Koch | 379/88.21 |
| 2008/0253549 A1 * | 10/2008 | Loveland | 379/202.01 |
| 2009/0005023 A1 * | 1/2009 | Toorn | 455/415 |
| 2009/0061833 A1 | 3/2009 | Ho et al. | |

FOREIGN PATENT DOCUMENTS

| | | | |
|---|---|---|---|
| KR | 20070078369 A | 7/2007 | |

* cited by examiner

METHOD AND DEVICE FOR ENABLING MESSAGE RESPONSES TO INCOMING PHONE CALLS

TECHNICAL FIELD

The disclosed embodiments relate generally to the field of messaging, and more particularly, to a method and apparatus for enabling message responses to incoming calls.

BACKGROUND

Communication devices have evolved to include numerous types of communication capabilities and functionality. For example, handheld devices exist that operate as cellular phones, messaging terminals, Internet devices, while including personal information management (PIM) software and photo-management applications. Additionally, Internet Protocol services exist that can transform Internet-enabled machines into telephony devices. Even stand-alone telephones that connect to traditional Public Switched Telephone Networks (PSTN) now carry software to assist the user in making and managing phone calls.

Mobile phone networks have traditionally been limited to voice communications, but new technologies such as GSM (Global System for Mobile Communications) have enabled mobile phone networks to also include data communications. For example, SMS (Short Message Service) messaging provides a software-independent protocol to send short text messages composed of either: 160-7 bit characters; 70-16 bit characters; or 140 octets of binary data. Individual SMS messages thus require a relatively small network bandwidth and devices can receive messages, even when connected to a voice call. The number of SMS messages a user receives has continually increased because many new types of network devices have joined mobile phone networks. These devices include, for example, PDAs, hybrid PDA/mobile phone devices, and other text messaging devices using GSM networks. Additionally, PSTN devices also exist that support messaging applications such as SMS.

DETAILED DESCRIPTION

Embodiments described herein enable message replies to be made to incoming callers. In an embodiment, a device that receives an incoming phone call, for example, may be used to transmit a message as a reply to the caller. For example, rather than pick up a phone call or forward the phone call to voicemail, the user may simply generate a text (or other form of) message to the caller.

Embodiments of the invention recognize that in some cases, a user answering or not answering a phone call is inconvenient, either to the recipient of the phone call, or the caller, As such, embodiments described herein provide an alternative of messaging the caller of an incoming phone call, rather answering the phone call or forwarding the phone call to voicemail.

Embodiments described herein have particular application to mobile computing devices that offer voice and data capabilities on cellular networks. In this context, embodiments described herein allow the user of the device handling the incoming call to communicate with the caller without actually accepting the call. This can save both the caller and the recipient time, and "minutes" on their respective cellular plans. Furthermore, if the recipient of the incoming call cannot accept the incoming call, the recipient is saved the trouble of having to respond to a voicemail message or having to find the time to return a call.

While one or more embodiments of the invention are described for use with mobile, cellular devices, other telephony and computing devices are contemplated for use with embodiments of the invention. For example, some phones that connect to traditional wireline phone networks have capability to transmit and receive messages.

In one embodiment, a computing device is configured to receive an incoming communication from another computing device. The incoming communication may be for purpose of initiating a voice-exchange session. In response to receiving the incoming call, the computing device may identify or determine a message identifier of the other computing device. The message identifier is determined based at least in part on data provided with the incoming communication. The computing device may programmatically address a message to the other computing device using the message identifier determined from the incoming communication.

According to an embodiment, a computing device is configured to provide a message reply to an incoming phone call. In one embodiment, the computing device identifies a phone number of a caller of the incoming call. The computing device may prompt the user of the computing device to generate a message reply to the incoming phone call. The computing device may then initiate the message reply by opening a message and addressing the message to the phone number of the caller of the incoming phone call.

A voice-exchange includes any data transfer method in which a user's speech or utterance is transmitted across a network to the location of another device or user in real-time (e.g. instantaneous) or near real-time (e.g. less than three seconds). Examples of voice-exchange includes standard telephony practice. Another example of voice-exchange is when a voice transmission is recorded and transmitted as an instant message or file to be received and played back at the recipient. In the latter case, the recipient may not be able to interrupt the speaker, due to time delay, while in the former case, the recipient can interact with the speaker as if they were standing next to each other.

As used herein, the term "instant message" or "instant messaging" means messages that when transmitted to a recipient, or rendered on a device of the recipient immediately, nearly immediately, or alternatively without user-action.

Numerous types of computer telephony devices exist. One type of computer telephony device for use with an embodiment is a wireless, mobile computing device, sometimes called the "smart phone". Such devices are generally small to fit in one hand, and provide cellular telephony features in combination with other applications, such as contact applications for managing contact records, calendar applications for managing and scheduling events, task applications for keeping lists, and camera applications for capturing images. Another type of computer telephony device contemplated with an embodiment is a desktop computer that is configured to include real-time voice data exchange (e.g. through use of Internet Protocol telephony). Still further, other types of computer telephony devices exist, including standalone devices that connect directly to a telephone network (whether Internet Protocol or Public Switch Telephony System) and provide software interfaces and applications.

Embodiments provide that methods, techniques and actions performed by the communication device are performed programmatically, or as a computer-implemented method. Programmatically means through the use of code, or computer-executable instructions. A programmatically performed step may or may not be automatic.

One or more embodiments described herein may be implemented using modules. A module may include a program, a subroutine, a portion of a program, or a software component or a hardware component capable of performing one or more stated tasks or functions. As used herein, a module can exist on a hardware component independently of other modules, or a module can be a shared element or process of other modules, programs or machines. A module may reside on one machine, such as on a client or on a server, or a module may be distributed amongst multiple machines, such as on multiple clients or server machines.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Figure 1:
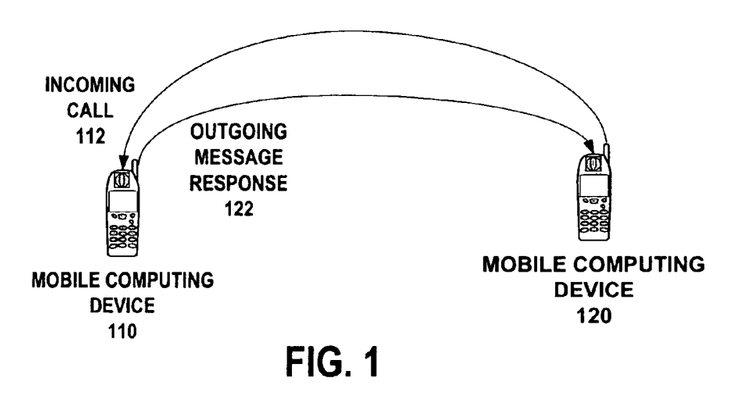
FIG. 1 is a diagram illustrating a computing device issuing a message response to an incoming caller, according to one or more embodiments of the invention.

FIG. 1 is a diagram illustrating a computing device issuing a message response to an incoming caller, according to one or more embodiments of the invention. In FIG. 1, an initiating computing device 120 ("calling device") places a call 112 to a recipient computing device 110. Rather than answer the call or perform some other action like forwarding the call to voicemail, one or more embodiments described herein provide that the recipient computing device 110 issues a message response 122 to the calling device 120. In one embodiment, the message response 122 is an alternative to the user of the recipient device 110 having to decline or not answer the incoming call 112.

In an embodiment, the message response 122 is an instant message, meaning that the contents of the message are rendered immediately when received on the calling device 110. One implementation provides that a content of the message response is text. For example, the user of the receiving device 110 may insert or compose a text message (e.g. "Call me later"). A text message response may be provided using a Short Message Service (SMS) format and application. Other embodiments provide for other types of content data to be included in the message, including MMS (Multimedia Messaging Service), EMS (Enhanced Messaging Service), or any data protocol capable of encapsulating messages for transport between networked devices. Thus, one alternative implementation provides that the user may send an image that communicates information. For example, the user may send an image of a clock showing a particular time, indicating that user's desire to be called back at a particular time. Still further, the user may include audio in the message response 122. For example, the user may send a voice blurb or a chime to indicate a message to the user of the caller device 120.

FIG. 1 illustrates implementation of embodiments of the invention with cellular telephony devices, since such devices normally handle both message transmissions and/or receptions over cellular networks. However, there are telephones VoIP (voice-over IP) phones and phones that connect to Public Switched Telephony Networks (PSTN) that can handle messaging. For example, some PSTN phones may support SMS message handling. Thus, embodiments of the invention may extend to devices and networks other than those that are used on cellular networks.

Furthermore, telephone calls are just one example of a voice-exchange session. Embodiments of the invention may be implemented in the context of other types of voice-exchange sessions. For example, caller device 120 may initially communicate a walkie-talkie communication to the recipient device 110, for which recipient device 110 sends back, for example, a text message response.

Component Overview

Figure 2:
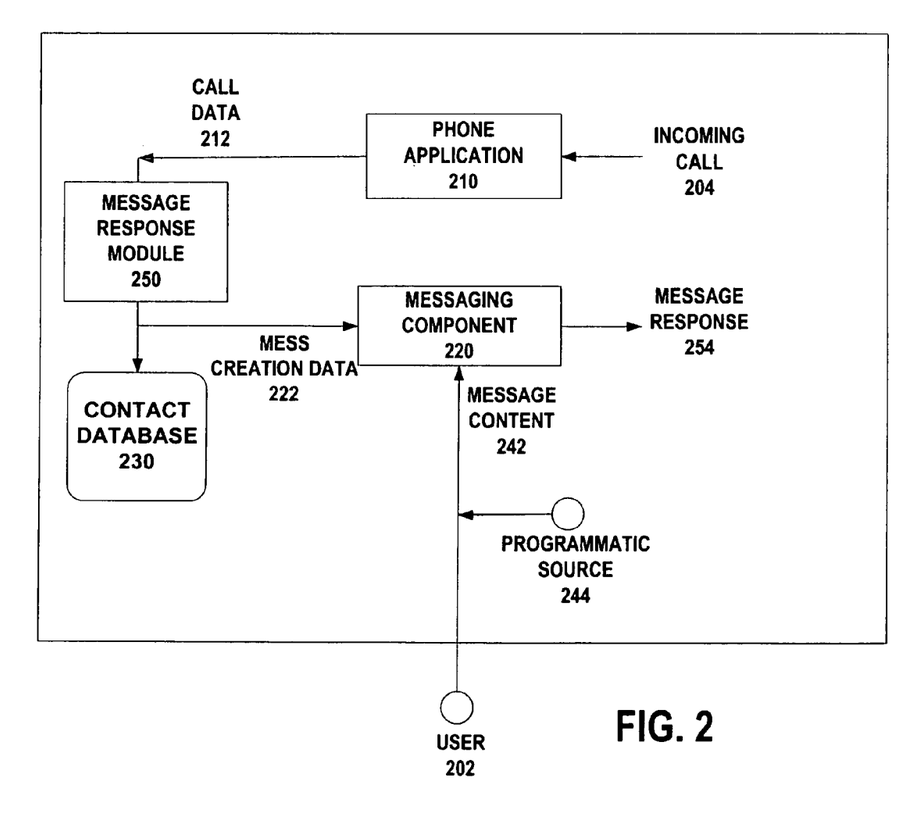
FIG. 2 illustrates components for use in a computing device configured according to an embodiment of the invention.

FIG. 2 illustrates components for use in a computing device configured according to an embodiment of the invention. In FIG. 2, a computing device 200 includes a phone application 210 and a messaging component 220. A message response module 250 may be incorporated to operate in connection with both the phone application 210 and the messaging component 220. According to an embodiment, the message response module 250 triggers initiation of a message response 254 to the incoming call 204. In one implementation, computing device 200 corresponds to a hybrid mobile device having telephonic and messaging capability over cellular networks (sometimes called a "smart phone"). The phone application 210 may correspond to a software element that manages voice data exchanged over one or more wireless communication components 318 (see FIG. 3). In one embodiment, messaging component 220 is an instant messaging application.

One example of a messaging application that is suitable for use with an embodiment is an SMS application, for sending and receiving text instant messages. Alternative instant text messaging applications may also be used. As another example, the messaging application 220 may correspond to a media-based messaging application, such as a Multimedia Messaging Service (MMS) application, for sending and receiving image data.

With reference to FIG. 2, computing device 200 may receive an incoming call 204, which is handled by the phone application 210. At an initial time, the incoming call 204 may include call data 212, which is identified by the phone application 210. In one embodiment, call data 212 includes identification information of the caller (e.g. "Caller ID" information). As such, call data 212 may include (i) a name of the caller, and/or (ii) a phone number used by the caller. The phone application 210 may identify call data 212 from the incoming call 204 while causing transmission of audio rings/chimes, rendering of image data containing the Caller ID information on a display of the device, and/or other incoming call notification (e.g. vibration).

The act of sending message response 254 to incoming call 204 may involve the following operations: (i) opening a new message for message response 254, (ii) addressing the message, (iii) including a message content 242 or body for the message, and (iv) instructing the messaging component 220 to send the message response. The message response module 230 may perform at least some of these operations by communicating message creation data 222 to the messaging component 220. The message creation data 222 may be generated at one time, or submitted in spurts based on the occurrence of other events. As such, some or all of the steps of sending the message response 254 may be performed automatically.

Alternatively, some or all of the steps of sending the message response 254 may be performed automatically, after input triggers are provided from the user 202. For example, in one case, the user may designate a setting on the computing device 200 to handle all incoming calls with a message response (e.g. "on vacation").

As another alternative, in one implementation, the message creation data 222 is generated in response to a trigger from a user 202. The phone application 210, message response module 230, or some other component may prompt the user to message respond to a caller in response to receipt of call data 202. The prompt may occur shortly after the incoming call 204 is received, such as with or before the first "ring" generated on the computing device 200 for the incoming call. For example, the user may be able to elect message response as one option along with other options of answering or declining the incoming call 204.

The message creation data 222 may be based on call data 212. In one embodiment, the message creation data 222 may include (i) control data to cause the messaging application 220 to open a new message, and (ii) an address along with other data/instructions for addressing the newly created message. The message content 242 may be provided by a programmatic source 244, and/or by the user 202. In one embodiment, user 202 provides all of the message content 244. In another embodiment, the programmatic source 244 generates the content, in response to a user-input or other trigger. For example, the programmatic source 244 may generate a macro message in response to a user selecting to have incoming call 202 handled by the message response 254. Alternatively, content 242 may be a combination of content provided by the programmatic source 244 and the user. For example, the programmatic source may provide a template content that the user fills in. To illustrate, a portion of the message content 244 may correspond to "please call me in ______ minutes." The portion of the message content 244 provided by user 202 may correspond to "5".

An embodiment provides that the address provided by the message creation data 222 is a phone number of the incoming caller. In one embodiment, no verification or check is performed to determine if the device used by the caller is message enabled. For example, the user may manually make this selection in response to seeing the number being used by the caller. If the user recognizes the number as belonging to a cell phone, for example, the user may be assured that the caller's device is message-enabled. Otherwise, the message response 254 may be transmitted, but not received by the caller.

In another embodiment, a programmatic verification step is performed to see if the caller's device is enabled to receive the message response 254. In one embodiment, the message response module 250 (or other programmatic element) may match the number of the caller to a field of a given contact record stored with a contact database 230 on the computing device. If, for example, the contact record information identifies the number of the incoming call as belonging to a "mobile" number, the messaging response module 250 may do one or more of the following: (i) provide an indication that message response is available, (ii) enable the user to elect message response option, and/or (iii) programmatically initiate a new message addressed to the number of the caller.

Conversely, if the number of the incoming call is not identifiable as being message-enabled, embodiments provide that (i) a message or other indication is provided to the user warning that the caller's device is not message enabled, or (ii) the message response feature is disabled. One embodiment may distinguish between not knowing whether the device of the caller can receive messages, and knowing definitively that the caller's device cannot receive incoming messages. For example, in the former case, no action may be taken so that the message response feature is enabled, or a warning may be provided to the user indicating that the caller's device may not be message-enabled. In the latter case, message response may be disabled. Numerous other scenarios are possible and contemplated under embodiments of the invention.

Hardware Diagram

Figure 3:
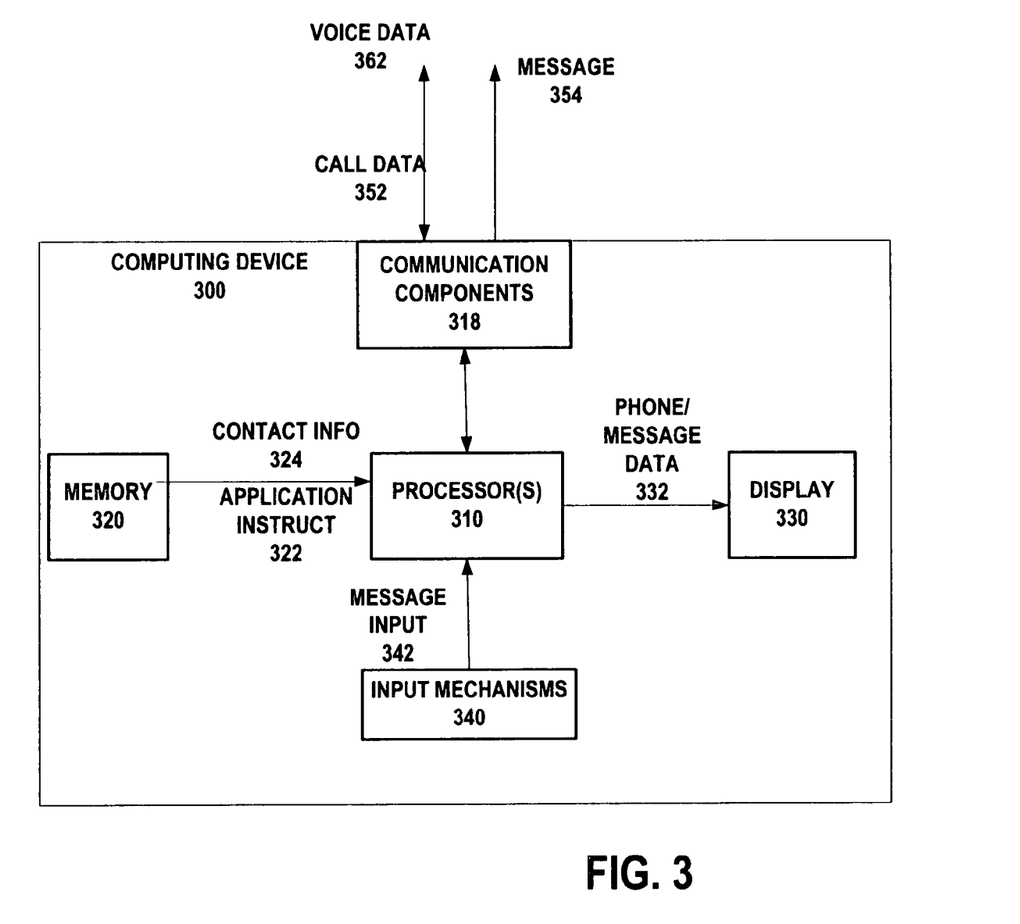
FIG. 3 is a hardware diagram for use with one or more embodiments of the invention.

FIG. 3 is a hardware diagram for use with one or more embodiments of the invention. In FIG. 3, a computing device 300 includes one or more processors 310, one or more memory components 320, and a display 330. One or more communication components 318 may enable receipt of call data 204 (FIG. 2), voice exchanges, and message responses 254 (FIG. 2). In one embodiment, the communication components 318 are for wireless communications, and cellular network communications in particular.

The communication components 318 may configure computing device 300 to transmit and receive communications on Code Division Multiple Access (CDMA) networks, Global System for Mobile Communications (GSM) networks, and/or other types of cellular networks. The communication components 318 may include a Subscriber Identity Module (SIM) card, an input/output controller, a radio frequency transceiver, and an input/output controller. Combined, communication components 318 may enable voice-exchange, as well as text and other kinds of message data exchanges.

The processors 310 may retrieve from the memory components 320 instructions ("application instructions 322") for executing operations such as described in FIG. 2. With reference to FIG. 2, the application instructions 322 may correspond to execution of phone application 210, messaging application 220 and message response module 230. Phone and/or message data 332 generated from execution of these applications may be signaled to the display 330 so that they can be viewed by the user.

Input mechanisms 340 may enable the user to enter message input 342. The message input 342 may correspond to input triggers, corresponding to, for example: (i) decisions of the user to message reply to an incoming call, (ii) to include a specific pre-formulated message content 242, and/or (iii) to send the message response 254. As an alternative or additional functionality, message input 342 generated by the input mechanisms may include one or more manual entry items, including for example: (i) address and/or phone number of the recipient, and (ii) some or all of the message content 242 (FIG. 2).

When used to compose message content 242 (FIG. 2), input mechanisms 340 may have any one of a variety of forms. For example, input mechanisms 340 may correspond to a set of hard or soft keys (soft keys may be iconic in form and displayed through use of a contact-sensitive display) arranged in the form of a QWERTY keyboard or other layout. The message input 342 may correspond to alphanumeric content, including phrases, keywords, or images that can be generated through use of keyboards (e.g. happy face). As another example, input mechanism 340 may correspond to a microphone, so that the message input is a voice file. Still further, the input mechanism 340 may correspond to a camera or other image capturing device, which captures an image for the message response 354.

According to one embodiment, components 318 receive call data 352 when a phone call or other voice-exchange session is initiated. Subsequently, such as in response to a call pick-up, voice data 362 may be received and transmitted. In one embodiment, a message 354 is transmitted as an alternative to the voice data 362 being exchanged. In another implementation, the message 354 is provided prior to the voice data exchange 362. For example, as described below, transmission of message 354 may result in an understanding between the caller and the recipient that the call pick-up will be delayed.

Methodology

Figure 4:
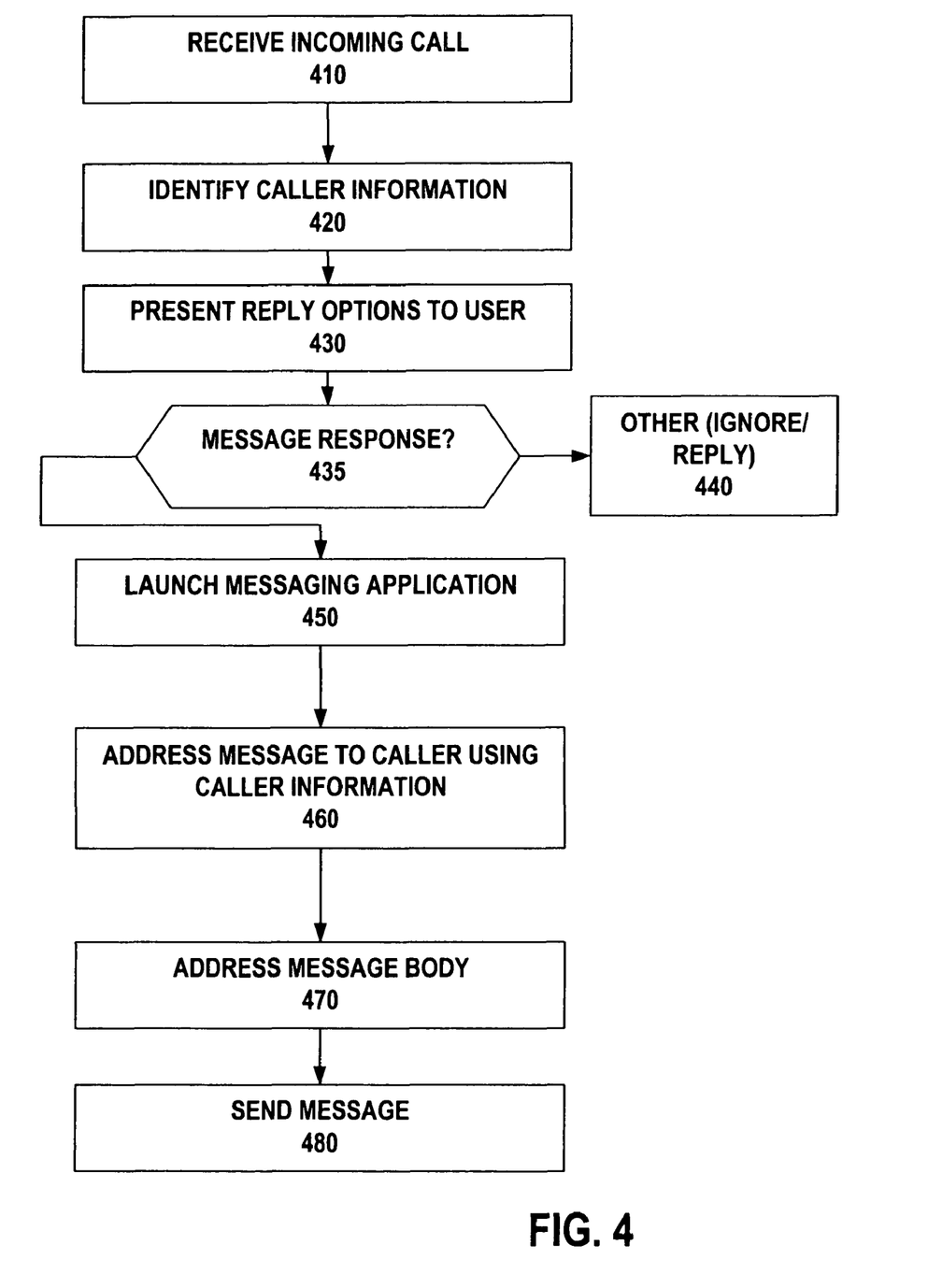
FIG. 4 illustrates a message for handling incoming calls with message replies, under an embodiment of the invention.

FIG. 4 illustrates a message for handling incoming calls with message replies, under an embodiment of the invention. An embodiment such as described in FIG. 4 may be performed using components and elements such as described in FIG. 2 and other figures. Accordingly, reference may be made to elements of other figures for purpose of illustrating a suitable element or component for performing a step or sub-step being described.

In step 410, an incoming call is received. The call may be transmitted over a cellular network, from one mobile device to another.

Step provides that caller information is identified on the recipient device. This information may correspond to "Caller ID" information, which may include a name of the caller, and a phone number of the device being used to make the call.

According to one embodiment, reply options are provided to the user in step 430. For example, the user may be provided the options of answering the call, declining the call, or message responding to the call. Under one implementation, a graphic-user interface may be generated to enable the user to make the decision on how the call should be answered. The user may signal his or her decision by actuating, for example, a soft key that indicates one of the actions.

A decision is made in step 435 as to whether the user has elected the message response. If the message response was not elected, step 440 provides an elected or default reply action is performed. This may correspond to the phone call being answered, or forwarding the phone call to another phone number or voicemail.

If the user makes a decision in step 435 to message reply to the incoming call, then step 450 provides that a corresponding one of the messaging applications is opened, or otherwise presented in a state of use for the user.

In step 460, a message reply is addressed to the incoming caller. This step may include a new message being created and then addressed. Alternatively, an existing message (such as one stored in a draft folder) may be addressed. In an embodiment such as shown by FIG. 2, the message response module 250 may signal control data to the message application 210 to cause the message creation, and to cause the message application to use the phone number of the incoming caller in the address field of the newly created message.

Step 470 provides that the message body is inserted. Depending on the implementation, the message body may be created by (i) user-input, (ii) programmatically, or (iii) through a combination of user-input and programmatic creation. Programmatic content in the message body may be, for example, in the form of a template (text or image) or in the form of a macro. The macro may be triggered by user-input.

In step 480, the message is transmitted to the caller. The message may be transmitted automatically in response to an event, such upon completion of the message. Alternatively, the message may be transmitted through manual input from the user.

Figure 5:
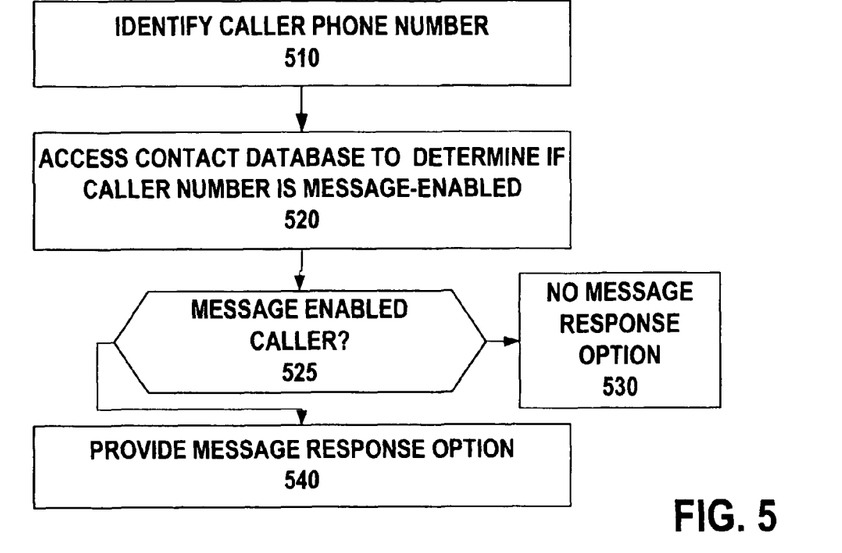
FIG. 5 illustrates an optional process that may be performed in order to determine or verify that a caller using a message-enabled device, under an embodiment of the invention.

FIG. 5 illustrates an optional process that may be performed in order to determine or verify that a caller using a message-enabled device, under an embodiment of the invention. In step 510, the caller's phone number is identified. As mentioned, an embodiment provides that the Caller ID information may be used to identify the phone number used by the caller of the incoming call.

In step 520, a database of contact records may be accessed to determine (i) a contact record that contains the phone number of the incoming call, and (ii) information provided in the contact record that indicates whether the device is message-enabled. With reference to FIG. 1, contact records stored in, for example, contact database 130 may be scanned for a contact record that contains the phone number of the incoming caller. The field assigned to the identified phone number may be the indicator of whether the device of the caller is message-enabled.

In step 525, the determination is made as to whether the device of the caller is message-enabled. For example, if the phone number of the incoming call is matched to a contact record, and the number is listed in the contact record as belonging to a mobile, cellular device, the determination in step 525 may be that the caller's device is message-enabled. Step 540 provides that a message response feature is provided as an option to the user if the determination in step 535 is that the caller's device is message-enabled.

One embodiment provides that if the determination in step 525 is negative, then step 530 provides that no message-response options are provided to the user. For example, step 530 may be performed in response to the determination that (i) that the caller's device is not message-enabled, or (ii) unknown. Alternatively, unknown numbers may be treated as message-enabled.

While an embodiment such as described with FIG. 4 illustrates the use of multiple reply options, alternative implementations may be used where no reply option is provided. For example, the user may designate (i) message replies are to be generated for all incoming calls, or (ii) message replies are to be generated for all callers whom are known to be using a message-enabled device; or (iii) message replies are to be generated for a specific caller or set of callers. Thus, the user may remove the need to decide through manual input whether a particular call should be message replied. Additionally, message generation may correspond to (i) the message being created and addressed, or (ii) the message being created, addressed, and transmitted. In the latter case, pre-formulated or programmatically generated content may be inserted as message content 242 (FIG. 2).

Usage Scenarios

Figure 6A:
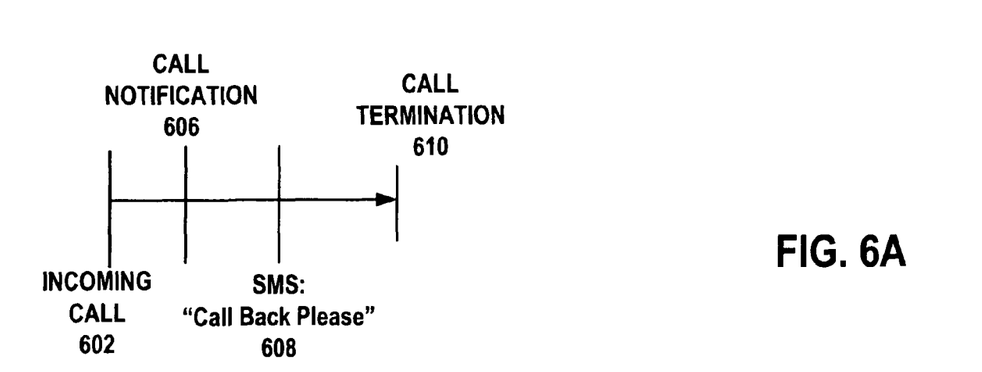
FIG. 6A and FIG. 6B illustrate timelines for different usage scenarios, under one or more embodiments of the invention.
Figure 6B:
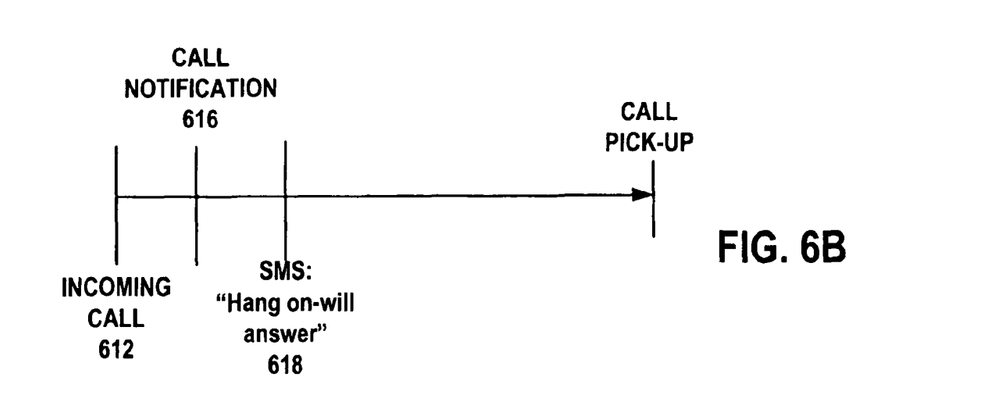

FIG. 6A and FIG. 6B illustrate timelines for different usage scenarios, under one or more embodiments of the invention. In particular, FIG. 6A and FIG. 6B illustrate different show message responses where the manner in which an incoming phone call is resolved differently. In the case of FIG. 6A, the incoming call is declined, while in FIG. 6B, the incoming call is answered.

In FIG. 6A, a timeline is shown for an embodiment in which the user can message response the user in connection with declining to answer the incoming call. At an initial time, the incoming call 602 is received. One embodiment provides that a call notification 606 is generated. The call notification 606 may display, for example, information on the caller or the caller's number. The call notification 606 may also present options as to whether the user can answer the call, decline the call, and/or message reply the call. In the scenario shown by FIG. 6A, the user elects to message reply the user with an SMS message 608. In one implementation, the SMS message 608 may occur at a later time in order to give the user a chance to enter input as part of the message body. The SMS message 608 may include content entered or selected by the user that communicates the user's intent to have the caller call back at a later time. At a time when the caller receives the SMS message 608, termination 610 may occur, at the option of the user.

FIG. 6B illustrates a timeline where a message response is provided in connection with the recipient of an incoming call answering the call. At the initial time, the incoming call 612 is received. As with the previous scenario, the call notification 616 may occur to provide the user with the opportunity to answer, decline, or message reply to the incoming call. In the scenario shown, the user replies to the incoming call with a SMS message 618 subsequent to the call notification 616 occurring. In this scenario, the user wants to answer the call, but would like to have more time. The SMS message 618 may communicate this intent through content entered or selected by the user. At a delayed interval, the all pickup 620 occurs. In a scenario shown by FIG. 6B, the user may need to delay voicemail forwarding or pickup, so that the incoming call and "ring" for an extended duration.

Numerous other usage scenarios are contemplated with embodiments of the invention. For example, a user may elect to automatically message reply all incoming calls when the user is unavailable (e.g. "on vacation"). Alternatively, the user may elect to have all calls from a particular caller message replied automatically, with a standard message for that caller or class of callers (e.g. "use my other number"). Examples such as described enable users the convenience of initiating a communication with a phone call, but communicating using less intrusive or more rapid communication responses as a substitute for a conversation. Still further, the user may maintain a list of preformed text message responses. In response to an incoming call, the user may scroll the device and select one of the preformed responses, such as "Call back" or "Try me tomorrow at home".

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for operating a first computing device, the method being implemented by one or more processors of the computing device and comprising:
   receiving, from a second computing device, an incoming call to initiate a voice-exchange session;
   in response to receiving the incoming call, determining a message identifier associated with the second computing device, wherein the message identifier is determined based at least in part on data provided with the incoming call;
   in response to receiving the incoming call, prompting a user of the first computing device to enter user input that instructs the first computing device to handle the incoming call by composing, while not answering the incoming call, a message to a user of the second computing device; and
   responsive to receiving the incoming call and the user entering the user input, automatically addressing the message to the second computing device using the message identifier determined from the incoming call.

2. The method of claim 1, further comprising:
   generating a graphic user-interface feature that prompts the user to elect to have the message at least partially composed in response to the incoming call.

3. The method of claim 1, wherein automatically addressing the message includes using the message identifier to identify and enter an address for an instant message.

4. The method of claim 3, wherein automatically addressing the message includes using the message identifier to enter at least an address for the message in a Short Message Service format.

5. The method of claim 4, wherein the message is composed using a Short Message Service application, and the message identifier is a phone number.

6. The method of claim 3, wherein determining the message identifier includes determining the message identifier from a phone number of the second computing device.

7. The method of claim 1, further comprising:
   verifying that the second computing device is enabled for receiving the message.

8. The method of claim 7, wherein:
   verifying that the second computing device is enabled for receiving the message includes (i) identifying a phone number of the other computing device used for the incoming call, and (ii) determining that the phone number is associated with a message-enabled device that can handle a text or instant message response.

9. The method of claim 8, wherein determining that the phone number is associated with a message enabled device includes accessing a contact record of a caller of the incoming call using the data provided with the incoming call, and using the contact record to verify that the phone number is capable of being used to receive the message.

10. The method of claim 9, wherein the message is an instant or text message, and wherein using the contact record to verify that the phone number is capable of being used to receive the instant or text message includes checking the contact record associated with the caller to see whether the phone number of the incoming call is for a mobile telephony device that can handle the instant or text message.

11. The method of claim 9, wherein determining that the phone number is associated with the message enabled device is performed programmatically and automatically.

12. The method of claim 1,
   transmitting the message to the second computing device using a phone number of the incoming call as the address for either a new instant message or a new text message.

13. The method of claim 12, wherein transmitting the message includes using either an instant or text messaging application for transmitting the new instant message or the new text message.

14. The method of claim 13, further comprising launching either the instant or text messaging application automatically, in response to one of (i) receiving the incoming call, or (ii) receiving the input from the user of the first computing device.

15. The method of claim 1, further comprising enabling the user of the first computing device to provide content manually for the message.

16. The method of claim 1, further comprising enabling the user of the first computing device to trigger insertion of pre-formulated content for the message.

17. The method of claim 1, further comprising:
automatically and programmatically providing at least a portion of a body of the message.

18. The method of claim 1, wherein the first computing device is the intended recipient of the incoming call.

19. A computing device comprising:
one or more communication components, at a first computing device, for handling voice and messaging communications over wireless networks; and
one or more processors configured to:
handle an incoming phone call from a second computing device;
in response to receiving the incoming phone call, (a) prompt a user of the first computing device to enter user input that instructs the first computing device on how to handle the incoming call, including providing the user with an option to (i) answer the call, or (ii) send the second computing device a message without answering the incoming call;
in response to receiving the incoming phone call, determine a phone number of the second computing device based, at least in part, on the incoming phone call; and
in response to receiving the user input to send the second computing device the message without answering the incoming phone call, programmatically generate at least an address of the message to be transmitted to the second computing device using the phone number identified from the received phone call.

20. The computing device of claim 19, wherein the one or more processors are configured to enable a text message to be generated as the message to be sent to the second computing device without answering the incoming phone call.

21. The computing device of claim 19, wherein the one or more processors are configured to enable the message that is to be sent to the second computing device to include a message body of a format selected from one or more of text, image or audio.

22. A computing device comprising:
one or more processors;
one or more wireless communication ports that communicate with the one or more processors to enable the device to handle both voice and messaging communications over one or more wireless networks;
wherein the one or more processors are configured to:
receive an incoming telephony communication over one of the wireless communication ports from another computing device;
in response to receiving the incoming telephony communication, determine a message identifier of the other computing device, wherein the message identifier is determined based at least in part on data provided with the incoming telephony communication; and
enable a user to elect to respond to the incoming telephony communication by programmatically addressing a message to the other computing device using the message identifier that is communicated with the incoming telephony communication,
wherein the computing device, in response to receiving the incoming telephony communication, displays a user interface that enables the user to elect to respond to the incoming telephony communication by sending a instant message or text message or answering the incoming telephony communication.

23. The computing device of claim 22, further comprising a display, and wherein the one or more processors are configured to generate on the display the user-interface, wherein the user interface further enables the user to elect to extend an amount of time in which the computing device waits before answering the incoming telephony communication by initiating voice mail.

24. The computing device of claim 22, further comprising memory resources that store a plurality of contact records on the computing device, and wherein the one or more processors are configured to make a determination as to whether a phone number of the incoming telephony communication is associated with a message enabled device.

25. The computing device of claim 24, wherein the one or more processors are configured to make the determination by accessing a corresponding one of the plurality of contact records of the caller using the data provided with the incoming telephony communication, and using the corresponding contact record to verify that the phone number is capable of being used to receive the message.

* * * * *

UNITED STATES PATENT AND TRADEMARK OFFICE
CERTIFICATE OF CORRECTION

| | | |
|---|---|---|
| PATENT NO. | : 7,844,037 B2 | Page 1 of 1 |
| APPLICATION NO. | : 11/200511 | |
| DATED | : November 30, 2010 | |
| INVENTOR(S) | : David Champlin et al. | |

It is certified that error appears in the above-identified patent and that said Letters Patent is hereby corrected as shown below:

In column 1, line 41, before "DESCRIPTION" insert -- BRIEF --.

Signed and Sealed this
Third Day of July, 2012

David J. Kappos
*Director of the United States Patent and Trademark Office*